Dec. 12, 1967     L. C. MATSCH ET AL     3,357,586
APPARATUS FOR CONSERVING AND DISPENSING VALUABLE MATERIALS
Filed Sept. 3, 1963     8 Sheets-Sheet 4

INVENTORS
LADISLAS C. MATSCH
JOHN A. PAIVANAS
DAVID I-J. WANG
NORMAN GIBBON
BY William F. Mesinger
ATTORNEY Dec. 12, 1967     L. C. MATSCH ET AL     3,357,586
APPARATUS FOR CONSERVING AND DISPENSING VALUABLE MATERIALS
Filed Sept. 3, 1963     8 Sheets-Sheet 5

INVENTORS
LADISLAS C. MATSCH
JOHN A. PAIVANAS
DAVID I-J. WANG
NORMAN GIBBON
BY William F. Mesinger
ATTORNEY Dec. 12, 1967   L. C. MATSCH ET AL   3,357,586
APPARATUS FOR CONSERVING AND DISPENSING VALUABLE MATERIALS
Filed Sept. 3, 1963   8 Sheets-Sheet 6

INVENTORS
LADISLAS C. MATSCH
JOHN A. PAIVANAS
DAVID I-J. WANG
NORMAN GIBBON
BY William F. Mesinger
ATTORNEY

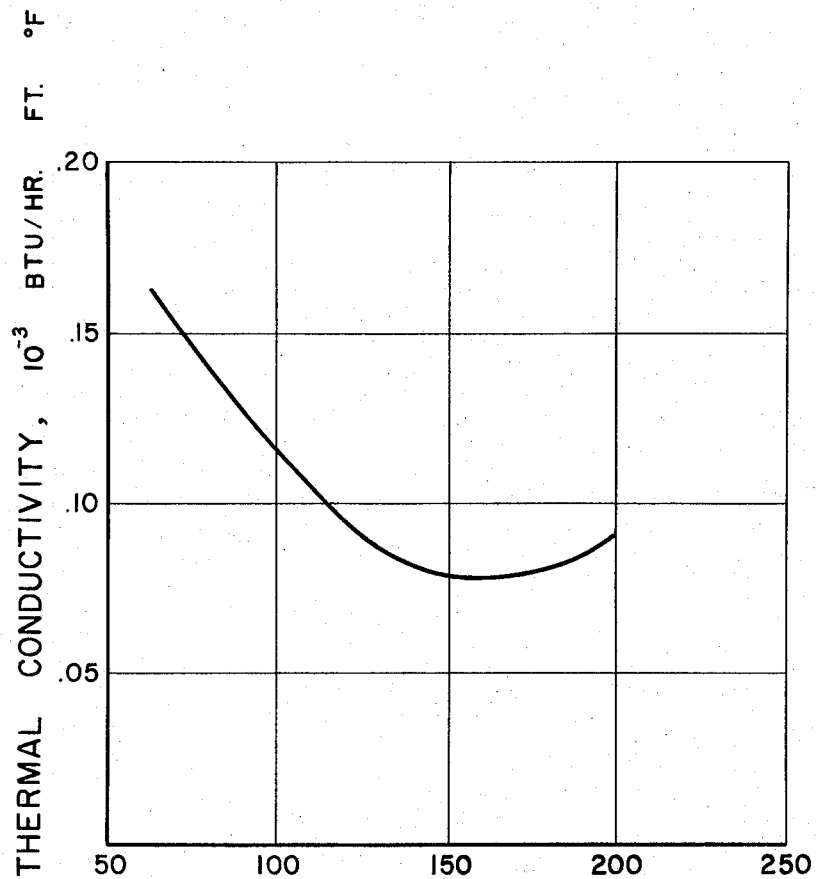

2,357,586
Patented Dec. 12, 1967

3,357,586
APPARATUS FOR CONSERVING AND
DISPENSING VALUABLE MATERIALS
Ladislas C. Matsch, Kenmore, John A. Paivanas, Williamsville, David I-J. Wang, Buffalo, and Norman Gibbon, Tonawanda, N.Y., assignors to Union Carbide Corporation, a corporation of New York
Filed Sept. 3, 1963, Ser. No. 306,371
9 Claims. (Cl. 220—9)

This is a continuation-in-part of application Ser. No. 118,739, now abandoned, filed June 21, 1961, in the names of L. C. Matsch et al.

This invention relates to thermal insulating structures enclosing an evacuated space as, for example, between the product holding inner vessel and the outer casing of double-walled containers. Still, more particularly, this invention relates to a multiple-layer type of thermal insulating system which is particularly suitable for minimizing the atmospheric heat inleak through the evacuated insulating space to product liquids as, for example, low-boiling cryogenic liquefied gases such as liquid oxygen and hydrogen.

As used herein, the expression "thermal insulating structure" includes any construction which is gas-tight and evacuable to sub-atmospheric pressure so as to reduce heat transfer through the structure's cross-section. The term "container" includes any construction capable of holding valuable materials as, for example, tanks, pipelines and rectification equipment.

The art has recently discovered composite insulating systems which are remarkably effective in reducing heat transfer by conduction and radiation. These systems are a flexible composite of a low heat conductive material component and a radiant heat barrier material component assembled sufficiently closely to provide at least 4 flexible layers per inch of composite insulation. The low conductive material is disposed generally perpendicular to the direction of heat transfer across the evacuated space, and serves to separate the several radiant heat barrier elements or components so that the latter are confined to substantially isothermal planes within the insulation. These systems are particularly suitable for insulating cryogenic liquids in double-walled containers from the effects of atmospheric heat inleak. The composite insulating material is installed in the evacuable space between the cryogenic liquid storing inner vessel and the outer casing and has been found to be at least ten times as effective as the conventional powder-in-vacuum system. Such insulations are described and claimed in U.S. Patents Nos. 3,007,596 and 3,009,600, respectively. These disclosures are incorporated herein by reference, and describe a composite of low conductive permanently precompacted fibrous paper material with a radiation-impervious reflecting component such as aluminum foil. Another suitable type of low conductive-radiation impervious composite insulation is a reflective metal-coated, non-metallic low conductive substrate material as, for example, the aluminum-coated polyethylene terephthalate film described in U.S. Patent No. 3,018,016 to M. P. Hnilicka, Jr. Another satisfactory metal-coated substrate is then metallized paper such as metallized glassine.

Still another composite multi-layered insulation for use in vacuum space between warm and cold boundaries consists of the paper layers and finely-divided radiant heat reflecting bodies of less than about 500 microns in size, being incorporated in and uniformly dispersed through the layers, as well as a binder for cementing the heat reflecting bodies to the fibers.

The number of layers of such composite insulation applied in unit thickness may be varied according to the degree of compression exerted on the insulation. As compression is increased, the number of effective radiation shields increases per unit thickness and heat transmission by radiation decreases. Concurrently, a greater mass of heat conductive solid material is compressed into a unit volume and heat transmission by solid conduction increases. The two opposing tendencies produce characteristic thermal performance curves with well-defined minima, denoting the most effective insulation obtainable with a given combination of components. The minimum point on the characteristic curve corresponds approximately to the optimal balance between radiation and solid conductance for the combination of components.

The minimum point is readily achieved with moderately thick fibrous sheets as, for example, with 4-mil thick paper sheets of glass fiber, as illustrated in FIG. 1. However, a serious problem is encountered when it is desired to introduce more radiation shields per unit composite insulation thickness, and thus reduce the radiative heat transfer. To accomplish this, substantially thinner layers of low conductive fibrous material must be employed. However, the use of very thin layers greatly increases the insulation density due to shear weight of the insulation itself, and causes high interlayer compression. The effect of this high compression is to increase solid conductance through the multi-layer insulation to a degree which more than offsets the expected advantages. The insulation thus over-compressed performs at a point on the characteristic curve where solid conductance predominates far above the minimum point. This problem is vividly illustrated in FIGS. 2 and 3, which are thermal conductivity curves for two very thin-layered, multi-layer insulations having glass fiber paper sheets of 2 and 0.6 mils, respectively. Although very low minima are theoretically achievable, the practical limits of usage, shown by the solid portions of the curves, have heretofore terminated at high-density points where solid conductance predominates far above the minimum point.

For the above reason, attempts to improve upon multi-layer insulations by the simple expedient of thinning the layers have not been successful. The thermal resistance is usually not improved and it is often actually impaired. In addition, the high density of the insulation adds unnecessarily to the weight of vacuum-insulated structures, and the application of greater numbers of layers in unit thickness increases both the material and installation costs of the insulation.

A convenient method for measuring the thicknesses of low conductive paper materials described herein is in accordance with Standard D-645 of the American Society for Testing Materials. This method involves measurement under a predetermined compression between the anvil and presser of a flat micrometer.

An object of this invention is to provide an improved thermal insulating structure containing multiple-layer composite insulation having very thin layers of low heat conductive material and radiant heat barrier material without high inter-layer compression and solid conductance.

Another object is to provide an improved thermal insulating structure containing multiple-layer composite insulation having very thin layers of low heat conductive material and radiant heat barrier material, with minimum overall thermal conductivity, characterized by an optimum degree of compression.

A still further object is to provide a double-walled cryogenic liquid container having an evacuable space between relatively warm and cold walls filled with a multiple-layer composite insulation having very thin layers of low heat conductive paper material and minimum overall heat transfer by solid construction and radiation.

Additional objects and advantages of this invention will be apparent from the ensuing disclosure and appended claims.

In the drawings:

FIG. 12 is a graph illustrating the effect of bulking on the thermal properties of still another form of composite multiple-layer insulation, aluminum flake-containing glass paper.

Corresponding items in the various figures have been identified by the same number in the interest of simplicity.

Figure 1:
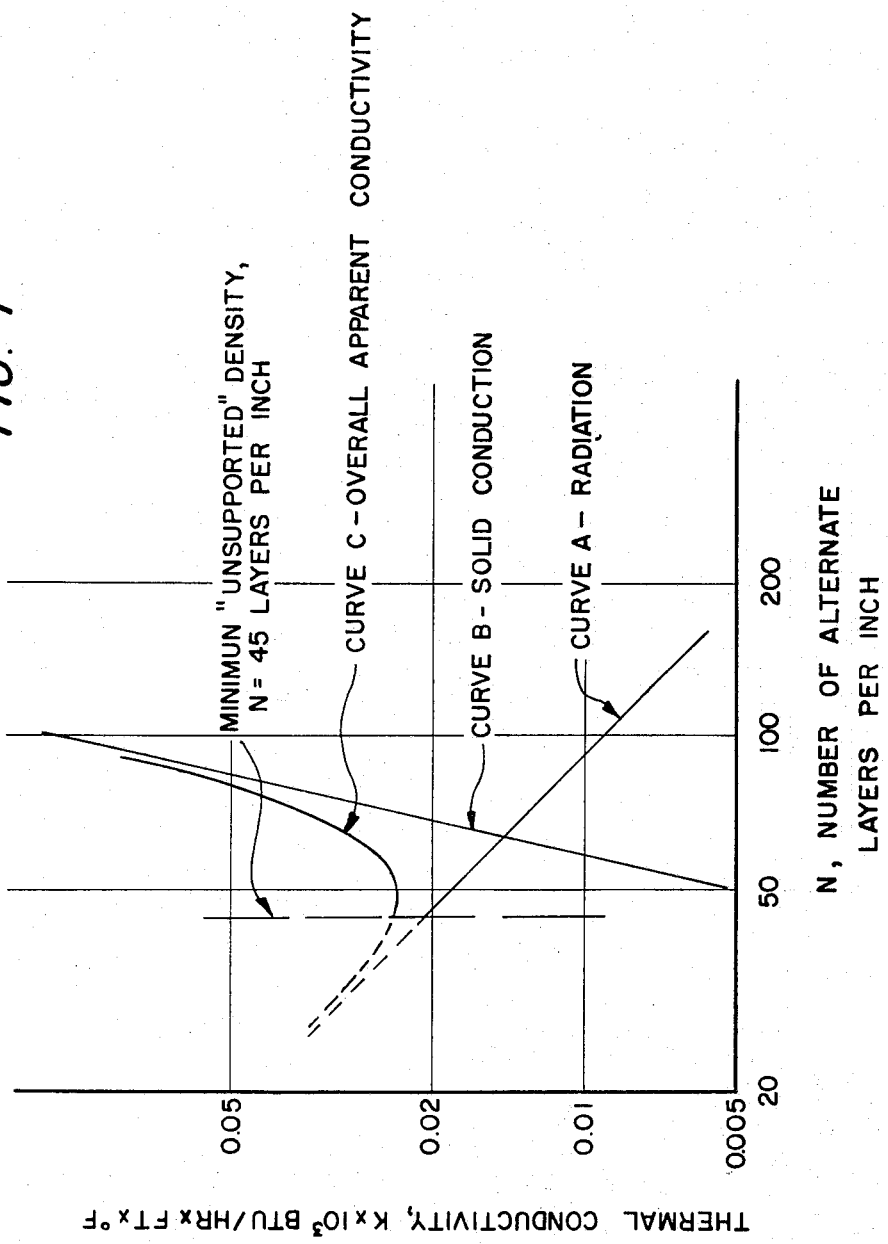
FIG. 1 is a graph showing the effect of increasing the number of layers per inch on the thermal conductivity of an illustrative multiple-layer type insulation having 4-mil thick glass fiber paper sheets.

This invention provides control of the multi-layer insulation independently of the thinness of the component layers. Stated in another way, one can now independently control the frequency of radiation barriers and also the total quantity of low conductive component associated with each barrier. Thus, the number of radiation barriers and the quantity of low conductive component can be optimized to give improved thermal performance not otherwise obtainable, even for very thin layers of the low heat conductive component, e.g., fibrous paper material. In addition, the weight and cost of the composite insulation will be decreased significantly.

These remarkable results are achieved by providing a low heat conductive, compressible bulking material between at least some of the composite insulation layers. The bulking material has a total surface area contiguously associated with a minor part of the surface area of the composite insulation layers. The bulking component is inserted or applied between layers of insulation to reduce the number of layers per inch of thickness.

One embodiment of the invention contemplates a thermal insulating structure comprising gas-tight walls enclosing an evacuable space. A heat-insulative and radiation-impervious composite flexible material is provided within this space, and comprises a low heat conductive material component and a radiant heat barrier material component assembled sufficiently closely to provide at least 4 layers of composite insulation per inch of evacuable space cross-section. Both components are disposed generally perpendicular to the direction of heat transfer across the evacuated space. As previously indicated, the bulking material layers are contiguously associated with only a minor part of the surface area of the composite material layers, adjacent bulking layers across the thickness of the evacuated space being at least partially aligned with each other.

More specifically, a preferred embodiment contemplates an apparatus provided with a gas evacuated insulating space contiguously associated with a heat transferable container enclosed by rigid, self-supporting walls. A heat insulative and radiation-impervious composite flexible material is contiguously associated with the heat transferable container in the insulating space. This material comprises a multiplicity of radiant heat barrier means and low heat conductive, permanently precompacted fibrous paper layers composed of fibers having diameters less than about 15 microns being disposed generally perpendicular to the direction of heat transfer across the insulating space. The bulking component may, for example, be in the form of glass fiber strips, each extending laterally around an inner vessel and spaced longitudinally along such vessel in lateral rows or strata of increasing diameter. Alternatively, the bulking component may be fibrous sheets having a multiplicity of holes therein as, for example, perforated sheets.

At least a portion of the bulking component provided under any given layer should be aligned over and in registry with bulking component provided under previously applied layers. Viewing the multiple-layer insulation in cross-section, the bulking component preferably produces a relatively dense "column" structure through the insulation thickness. This column preferentially supports the layers and transmits the interlayer compression to the supporting wall. Areas between the "columns" are at very low density, and may actually be less dense than the self-supporting density. As used herein, the phrase "self-supporting" density refers to the density assumed by a body of multiple-layer composite insulation without the use of the present bulking component when required to support its own weight under the force of gravity. Insulation maintained at below its self-supporting density is composed of "floating" barriers not dependent for support upon contiguous contact with a low conductive separator. Instead, barrier support is provided at distributed bulking zones whose total area comprises only a minor fraction of the total insulated area.

The achievement of a floating barrier structure over the majority of the insulated area is a close approach to the idealized concept of multiple radiation shields. Ideally, multiple shields are free-standing barriers of thin radiation impervious material, positioned as close together as surface and shape imperfections will permit, and separated only by a near-perfect vacuum.

The radiation barrier or shield material may comprise either a metal or metal coated material, such as aluminum coated plastic film, or other radiation reflective material. Radiation reflective materials comprising thin metallic foils are admirably suited in the practice of the present invention. The foils should have sufficient thickness to resist tearing or other damage during installation. For high-quality insulations, the foil should be as thin as practical, consistent with strength requirements. Thinness is beneficial because it facilitates folding and forming the insulation to fit the contour of the insulation space. It also minimizes the weight of the enclosing structure and reduces the weight of insulation which must be stabilized. In cryogenic vessels, low density is additionally important because it reduces the time and the quantity of expensive refrigeration needed to cool down the inner vessel nad establish a stable temperature gradient through the insulation. Foil thickness between 0.2 mm. and 0.002 mm. are suitable, and when aluminum foil is employed, thickness between 0.05 mm. and 0.002 mm. are preferred.

A preferred reflective shield is ¼ mil (0.00025 in. or 0.0062 mm. thick) plain, annealed aluminum foil without lacquer or other coating. Also, any film of oil resulting from the rolling operation should be removed as by washing. Other radiation reflective materials which are susceptible of use in the practice of the invention include: tin, silver, gold, copper, cadmium or other materials. The emissivity of the reflective shield material should be between about .005 and 0.2, and preferably between 0.015 and 0.06. Emissivities of 0.015 to 0.06 (98.5% to 94.0 reflectivity) are obtainable with aluminum and are preferred in the practice of this invention, while with more expensive materials such as polished silver, copper or gold, emissivities as low as 0.005 may be obtained. The above ranges represent an optimum balance between the high performance and high cost of low emissivity materials.

The base constituent of the insulation is preferably a suitably low conductive permanently precompacted fibrous paper or "mat" material which may be produced in sheet form. Since the individual fiber diameters are less than 15 microns, the sheets are thin enough to be flexibly bent. These materials are commonly prepared by uniformly depositing finely spun or alternated fibers at a desired rate on a moving belt and subsequently compressing the mat as, for example, between compression rolls or by vacuum. Among suitable fiber materials are glass, plastics, cellulose and ceramics.

A preferred composite insulation of the alternate layer type includes between about 4 and 200 layers per inch of both aluminum foil and glass fiber paper.

Alternatively, the low conductive material component and the radiant heat barrier material component may be bonded together as, for example, a reflective metal-coated plastic or paper. The low conductive substrate must be capable of remaining under vacuum for long periods of time without suffering damage and preferably should not contain volatiles which are slowly released to the evacuated space. The preferred substrates are organic plastic films which are free of volatile plasticizers. The plastic should contain no material having an equilibrium vapor pressure at 20° C. in excess of 10 microns Hg abs. Polyester resins are satisfactory and a particularly suitable bonded composite is the previously mentioned aluminum-coated polyethylene terephthalate film. The previously described paper sheets may also be employed as the substrate.

The substrate should have a thickness of between about 0.0002 inch and 0.002 inch, one suitable commercially available polyethylene terephthalate film being 0.00025 inch (0.000625 cm.) thick. Substrates of thickness less than 0.0002 inch become extremely difficult to handle and often contain an excessive number of pinholes resulting in discontinuities in the radiant barrier. On the other hand, substrate thicknesses greater than 0.002 inch merely add unrequired solid material which is heavy, expensive, and contributes needless solid conduction.

The reflective metal coating should be sufficiently thick to provide a low emissivity, preferably less than 0.06. Thus a coating possessing high reflectivity may be thinner than a coating of lower reflectivity. Suitable metals include gold, silver, copper and aluminum, the latter being preferred from the standpoint of cost. An aluminum coating thickness of about 0.0025 micron on the polyethylene terephthalate film has been found satisfactory.

If desired, the metal coated-low conductive substrate may be crimped or crumpled prior to insertion in the thermal insulating structure, so that only point contact between the layers is achieved. For example, the composite may be permanently wrinkled or creased generally parallel to the length of the composite with the wrinkles spaced approximately ⅛-¼ inch. However, these wrinkles are not necessary when the present invention is employed, as will be described hereinafter.

As a further alternative, the radiant heat barrier material component may be in the form of finely divided reflecting bodies of sizes less than about 500 microns. These bodies are incorporated in and uniformly dispersed through the previously described precompacted paper layers in an amount between about 10% and 60% by weight of the paper. A binder as for example colloidal silica is used for cementing the heat reflecting bodies to the individual fibers of the paper. Less than about 10% by weight reflecting bodies does not achieve a significant radiation barrier effect whereas greater than 60% reflecting bodies produces bridging of such bodies through and along the paper surface. The latter results in a solid conductive path.

The fibers may, for example, be formed of glass, ceramic, quartz, or potassium titanate, depending on the temperatures to which the composite multi-layered insulation will be exposed. For example, at temperatures below about 900° F. glass fibers are preferred but at high temperatures glass tends to soften and the other enumerated materials are more suitable. When glass fibers are used, they are preferably of less than 5 microns diameter, while a fiber diameter range of 0.2 to 3.8 microns gives best results. The above range represents a preferred balance between increasing cost of relatively small diameter fibers, and increased conductance and gas pressure sensitivity of relatively large diameter fibers.

The finely-divided radiant heat reflecting bodies may, for example, be formed of aluminum, copper, nickel and molybdenum. Again the selection of the reflecting body is influenced by the operating temperature of the insulating composite. Aluminum is stable at temperatures below about 900° F., and is preferred in this range. Best results are obtained when the radiant heat reflecting bodies are relatively small, with particle sizes of less than 50 microns as the major dimension. Aluminum and copper paint pigment flakes of less than 0.5 micron thickness are especially suitable for relatively low temperature systems.

The reflecting body-containing paper may, for example, be formed on standard paper-making machines using colloidal silica as a binder. This paper and its manufacture are described more completely in copending application Ser. No. 211,176 filed July 29, 1962, now Patent No. 3,199,714 in the names of W. J. Bodendorf and D. I-J. Wang, incorporated herein to the extent pertinent.

The bulking component may, for example, be formed of the same low conductive fibrous paper material employed as the insulation base constituent. Another suitable fiber material is used in an uncompacted, elastically compressible, resilient and fluffy state, preferably in the form of sheets and known as "webs." Such material is preferably sufficiently compressible so that the installed density as an element of the composite insulation is at least twice that of the uninstalled substance. Most webs have low tensile strength, and appropriate means must be provided to support a web-type bulking strip during installation. Suitable fibers include clean glass filaments having diameters between 0.2 and 5 microns such as those produced by the so-called flame attenuation process. A fiber diameter range of 0.5 to 3.8 microns is preferred. The web material is described more completely in U.S. Patent No. 3,009,601, incorporated herein to the extent pertinent.

Other suitable bulking agents include the reflecting-body containing paper described above and woven fibrous materials such as glass cloth.

In bulked insulation, "thinness" becomes almost as important as "low conductivity" in selecting the low conductive sheet component. In the composite insulations of low conductive fibrous paper and separate reflective metal foils, the surface contact between the foil and fiber paper becomes extremely light, and this interface apparently constitutes a major resistance to heat transfer. Thermal conductivity through the thickness of the paper sheet assumes lesser importance. In the interests of obtaining both extreme thinness and tear resistance, it is usually advantageous to employ a small amount of binder in the paper, preferably below about 20% binder by weight. Suitable binders include colloidal silica, cellulose and water glass, the first mentioned being preferred.

Figure 4:
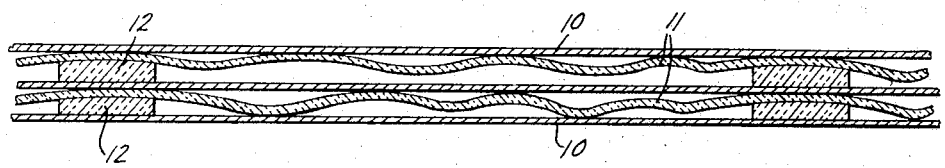
FIG. 4 is an elevation view taken in cross-section of a multiple layer insulation construction according to the present invention.

FIG. 4 illustrates one form of bulked multi-layer insulation in which radiation barriers such as aluminum foil shields 10 alternate with very thin low-conductive fibrous paper sheets 11. Although only two complete layers are represented in FIG. 4 for purposes of illustration, it will be appreciated that at least four layers per inch of the composite insulation are necessary for actual use of the invention. With these two components alone (no bulking component), the composite insulation would compress under its own weight to high density. For example, if the shields are ¼-mil annealed aluminum foil and the low conductive sheets are 2-mil thick unwoven glass fiber paper, normal wrapping will produce a multi-layer insulation having about 95 layers per inch and a density of 8.1 lb. per cu. ft. Both the weight and cost of this insulation are unnecessarily high. Furthermore, while the performance of such insulation is quite good $$(K_a = .031 \times 10^{-3} \text{ B.t.u./hr.ft.}$$

°F. between 70° F. and −320° F.), it is appreciably higher than the minimum shown in FIG. 4. Separation of the Ka value (overall conductivity) into radiation and solid conductance shows that solid conductance $K_{sc}$ is the dominant contributor.

It has been discovered that the same or better performance can be achieved with far less material by inserting bulking strips 12 between the layers of insulation. These strips are preferably a low-conductive fibrous material having a low thermal sensitivity to compression. Each strip may consist of a single ribbon of bulking material having a width greater than its thickness in the installed state, or several ribbons may be combined to produce the desired total thickness. By way of illustration, the before mentioned insulation consisting of aluminum foil and 2-mil glass fiber paper was bulked using 1-in. wide strips of the same glass fiber paper. The resultant insulation weighed only 5.1 lb. per cu. ft. contained only 60 layers per inch thickness, and exhibited a Ka of $0.021 \times 10^{-3}$ B.t.u./hr.ft. °F.

Figure 5:
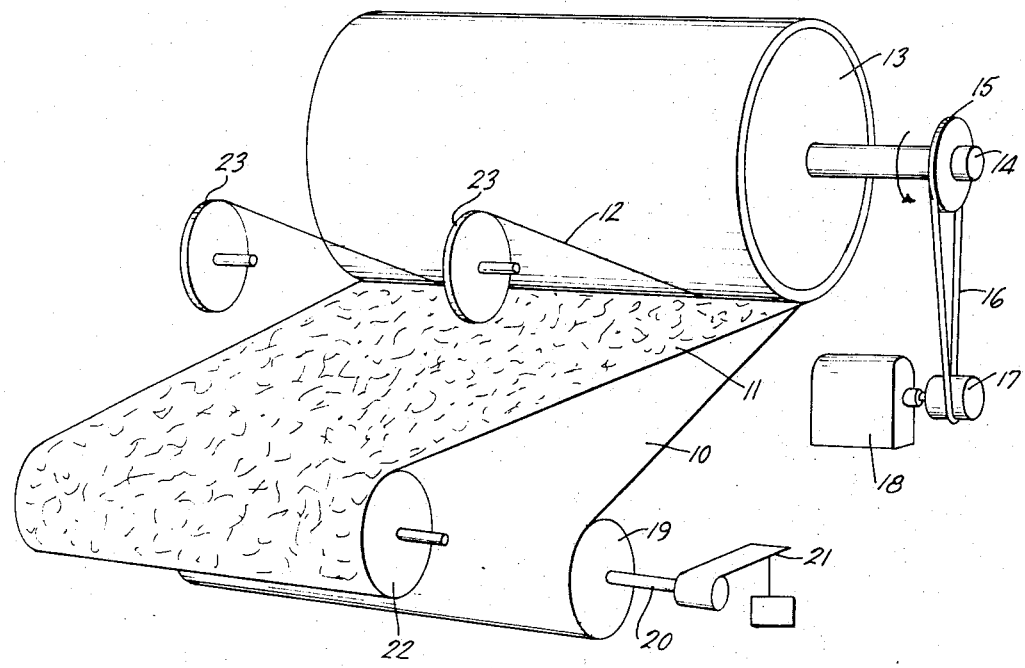
FIG. 5 is an isometric view of apparatus suitable for assembling the insulation of FIG. 4.

Apparatus suitable for assembling the bulked insulation of FIG. 4 is shown in FIG. 5. Container 13 is mounted horizontally on axial spindle 14 and is power-driven by sheave 15, belt 16, speed controller 17 and motor 18. Radiation barrier roll 19 is mounted on axle 20 fitted with friction brake 21 to adjust the roll tension and thereby control the insulation density. Low conductive fiber paper sheet roll 22 is mounted to rotate freely and feed sheet 11 onto container 13 without appreciable tension. Bulking strips 12 are fed also without appreciable tension from individual, free rotating rolls 23.

Figure 2:
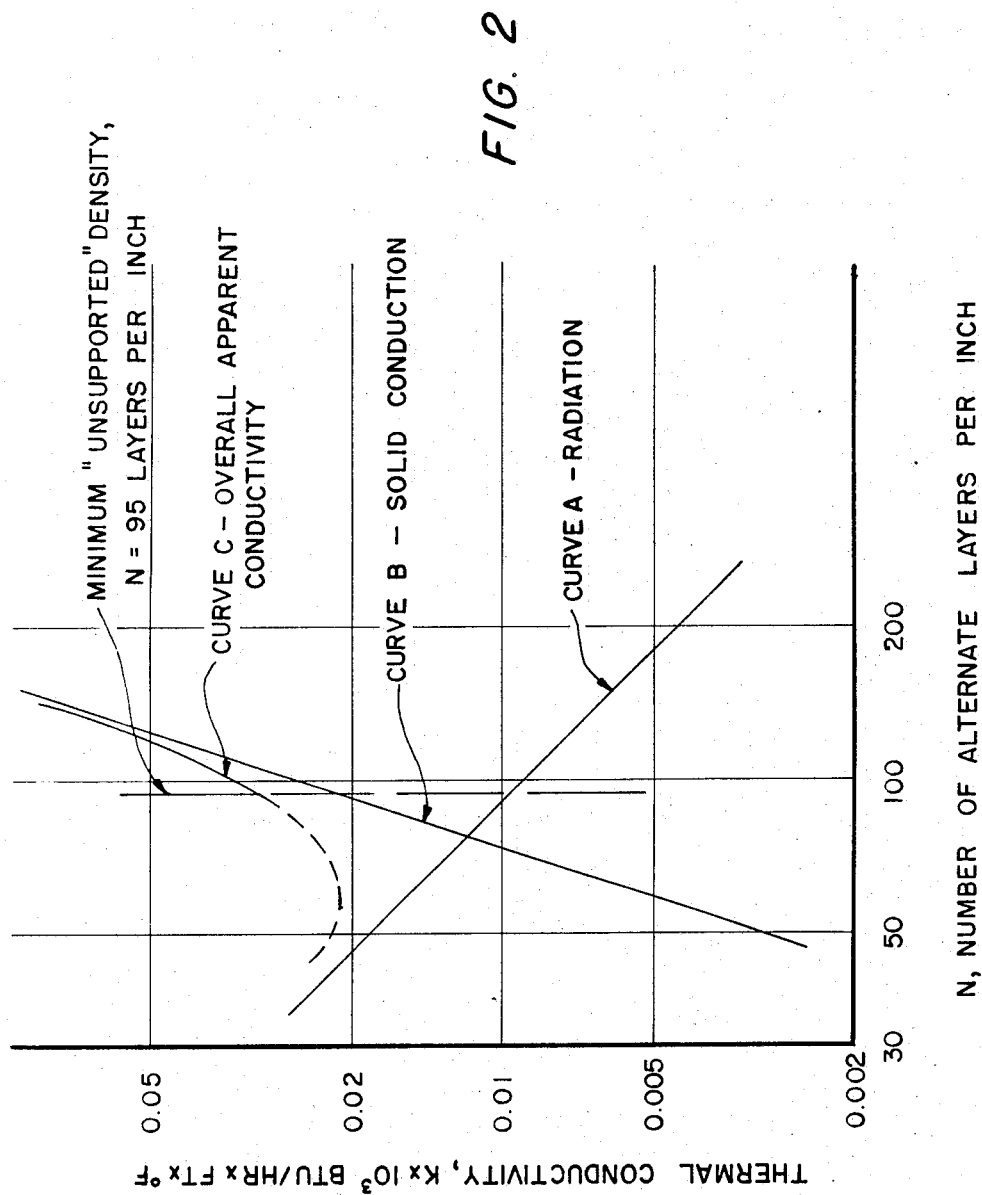
FIG. 2 is a thermal conductivity graph similar to FIG. 1 but representing insulation having 2-mil thick glass fiber paper sheets.
Figure 3:
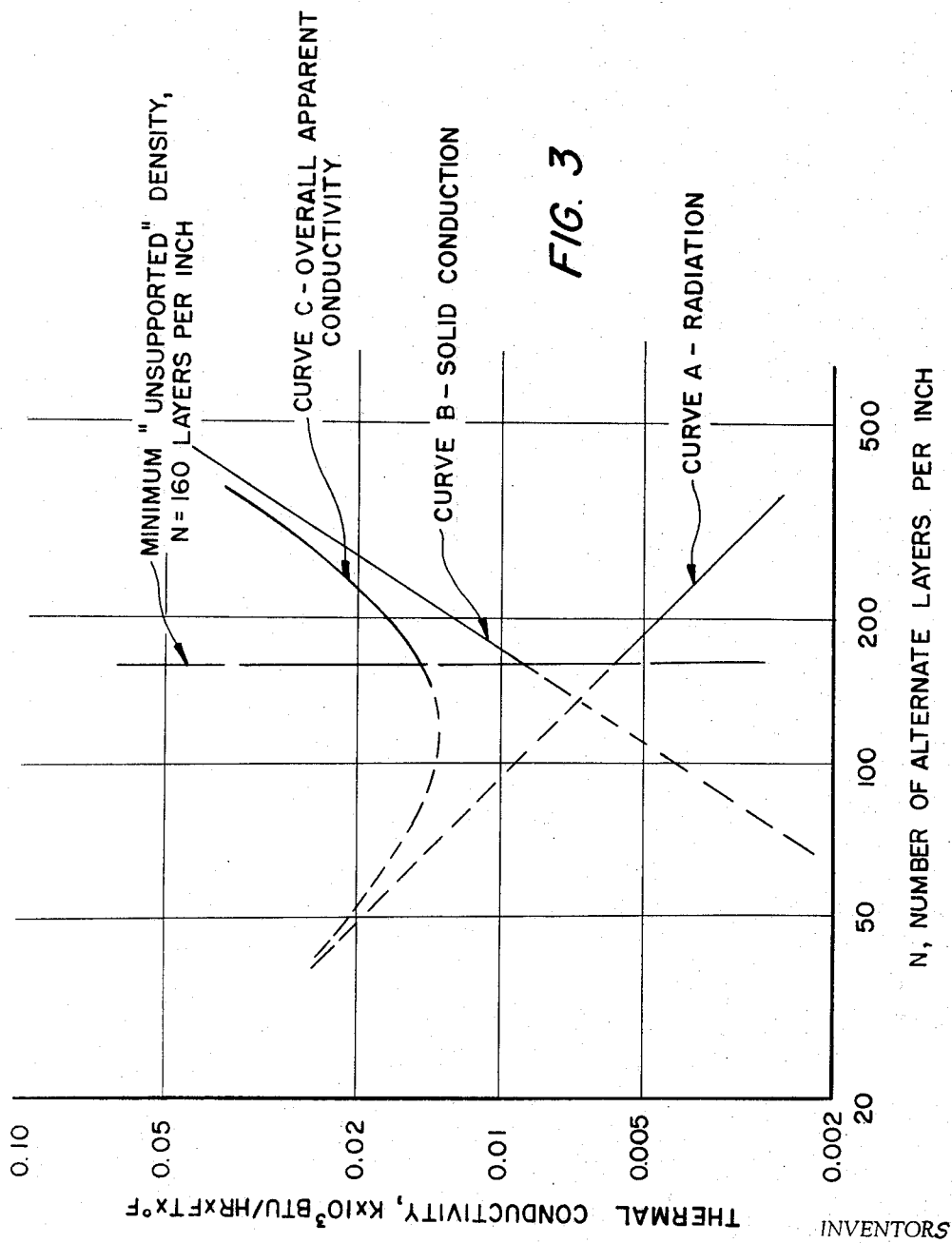
FIG. 3 is another thermal conductivity graph similar to FIG. 1 but representing insulation having 0.6-mil thick glass fiber paper sheets.

It is seen from the foregoing description that the invention provides an insulation consisting of closely spaced reflective shields characterized by a much-reduced quantity of low-conductive component associated with each shield. With this construction, it is possible to achieve lower thermal conductivities than heretofore attainable because the amount of the solid material associated with each layer can be reduced without simultaneously increasing the number of layers and internal compression of the insulation. This permits the construction of an insulating system containing the optimal layer density as illustrated by the minima of FIGS. 2 and 3.

While it is desirable to minimize the quantity of low-conductive component used in each layer, it is not possible to eliminate this component altogether. In FIG. 4, low-conductive fiber paper sheet 11 is preferably provided as thin and light in weight as possible, but it cannot be omitted completely from the assembly. When reflective foil shields are used, an essential function of the low-conductive component is to serve as a guard membrane preventing direct contact between adjacent radiation shields. Thermal short circuit between two shields even over a small area cancels the effectiveness of one shield, and it is practically impossible to avoid all sagging and irregular alignment of foils, particularly in curved insulated surfaces.

Areas covered by the bulking component will exhibit higher thermal conductivity than the low density areas, by virtue of the greater quantity of solid material provided at such regions. For this reason, the area of the bulking component should be minimized. It is also preferable that all the bulking area be in registry throughout the insulation thickness to provide maximum shield supporting effect from the extra solid material introduced for such purpose. Depending upon the shape and orientation of the bulking component, as little as 2% of the total area may be so covered by the strip-type bulking material and will satisfactorily support the barriers. Clearly, a greater barrier area should not be used than needed for support, and when a strip-type bulking component is used, as illustrated in FIG. 4, no more than 10% bulking area is preferred.

Figure 6:
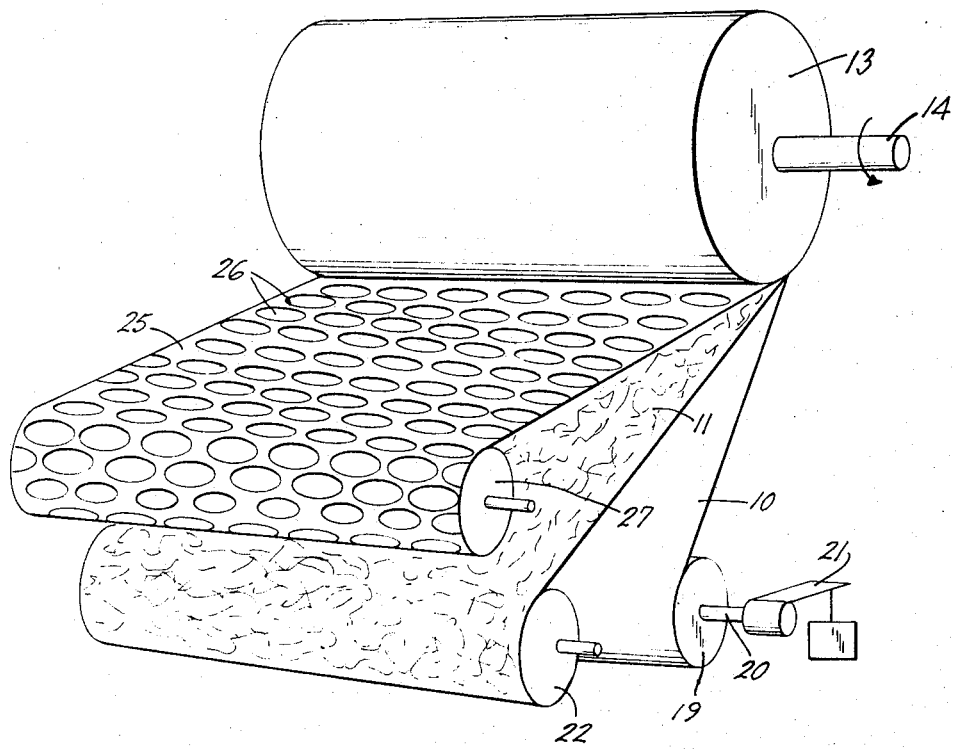
FIG. 6 is an isometric view of apparatus suitable for assembling a modified multiple layer insulation employing the principles of this invention.

FIG. 6 illustrates another form of bulking component, and apparatus suitable for its assembly with multi-layer insulation. The bulking component consists of fibrous sheets 25 such as glass fiber paper or webs having a multiplicity of holes 26 therein. For example, sheets 25 may have been perforated extensively to remove a substantial fraction of material. The remaining lattice structure is fed from roll 27 beneath radiation shielding 10 and low-conductive fibrous paper sheeting 11 and spirally wrapped around container 13. As may be expected, the percentage of the bulking sheet area that can be removed is limited because the sheet must retain sufficient strength to permit handling without damage. Furthermore, a greater bulking area is needed than with strips since a substantial portion of the bulking material will be out-of-registry or alignment with similar material between other layers.

In one example of the FIG. 6 embodiment, ¼-mil aluminum foil was alternated with one-mil thick fiber paper. This combination alone has been found to be stable at about 17.26 lbs./cu. ft. and 250 layers/in. A bulking sheet was used consisting of glass fiber paper having a density of 1.61 gms./sq. ft. which was perforated with 2-inch diameter holes to remove 57.4% of the area. The resultant insulation contained only 88 layers/inch and had a density of 7.45 lbs./cu. ft.

Still other forms of bulking component may be employed in accordance with this invention, as for example, an integral combination of the low-conductive fibrous paper sheeting with bulking structure. For example, bulking strips 12 of FIG. 4 may be incorporated directly into, or bonded onto, fiber sheets 11 so that both components may be handled and applied as a single element. Similarly, perforated sheet 25 may be bonded to low-conductive fiber paper sheet 11 of FIG. 6. Alternatively, patches of bulking material may be bonded to low-conductive fiber paper sheets 11 at scattered points across the surface.

It is not essential to apply the bulking component between all layers of the insulation. For example, the bulking component may be applied at each third layer with improved results. The internal compression in multi-layer insulation is accumulative, with each layer contributing an increment of compression to the total. If the compression produced, e.g., by three contiguous layers, is permissible, then the bulking component may be applied only at every third layer to space such groups of layers apart and thus limit the accumulation of compression.

FIG. 2 shows performance characteristics of 2-mil thick glass fiber paper, 1.6 gm./sq. ft., with ¼-mil annealed aluminum foil. The lowest density obtainable with simple, alternating layers of these components is about 95 layers/inch giving a conductivity of $0.031 \times 10^{-3}$ B.t.u./hr.ft.°F. With bulking strips, the optimum $$0.021 \text{ B.t.u/hr.ft.°F.} \times 10^{-3}$$

can readily be obtained at 60 layers/inch.

Another insulation characterized in FIG. 3 consists of ¼-mil aluminum foil separated by an ultra-thin glass fiber paper only 0.6 mil thick and weighing only 0.27 gm./sq.ft. Used alone, these components compact themselves to about 160 layers per inch and a density of 14.8 lb./cu.ft. The conductivity at this condition is expected to be relatively high (about $0.0145 \times 10^{-3}$ B.t.u./hr.ft.°F.) and attributable mainly to solid conductance. A bulked test has been conducted using ½-in. wide strips of unwoven fiber paper covering 5%–6% of the total area. At 110 layers/inch and 6.7 lb./cu.ft., the thermal conductivity is $0.0131 \times 10^{-3}$ between ambient and liquid nitrogen temperatures.

Utility of this invention is not limited to very high quality insulations but is also beneficial in constructions of intermediate quality. For example, an insulation was composed of alternate layers of ¼ mil aluminum foil and a thin, hard surface cellulose fiber paper of the Kraft type (6.05 gm./sq.ft.) having fiber sizes in the range of 10–70 microns. This construction was found to be reasonably stable only at very high N-values of about 190–200 shields per inch, where its thermal conductivity under good vacuum below 1 micron Hg and between ambient and liquid nitrogen temperatures is about $$0.075 \times 10^{-3} \text{ B.t.u./hr.sq.ft.°F./ft.}$$

Over 90% of this heat conductivity is contributed by solid conduction which means that the construction lies well up on the right side of a performance curve similar to FIG. 3. Furthermore, the bulk density of the composite is about 39 lb./cu.ft. which is very high compared with the value of 6 lb./cu.ft. readily achieved in other multiple layer insulations. It is evident that both lower density and lower conductivity can be obtained by bulking the layers, using for example strips of cellulose paper of suitable thickness to reach the optimum point on the curve.

Figure 7:
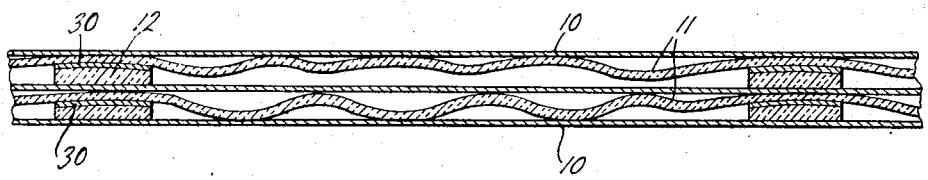
FIG. 7 is an elevation view taken in cross-section of a double-walled container constructed in accordance with this invention and employing radiation barrier strips.

A still further embodiment of the instant multi-layer insulation is illustrated by FIG. 7, in which the compression on bulking strips 12 is relatively light so that radiation still constitutes an important mode of heat transfer. To further reduce the heat transmission, radiation barrier strips 30 are provided in coextensive and contiguous relation with bulking strips 12. Strips 30 are preferably positioned between bulking strips 12 and low-conductive fibrous sheeting 11, and may, for example, be wound around a container from free rotating rolls similar to bulking strip rolls 23 of FIG. 5. The radiation barrier strips 30 may, for example, be formed of the same material as the basic radiation barrier component of the multi-layer insulation, such as aluminum foil of 0.002–0.2 mm. thickness.

As an alternative, the radiation barrier strips 30 may be combined with the perforated fibrous bulking sheet 25 of FIG. 6.

Another problem associated with multi-layer low-conductive fibrous paper sheeting, radiation barrier composite insulation is that of attaining structural stability under externally applied loads at the optimum number of layers per inch of insulation. Stability against sagging and slippage depends upon the development of restraining frictional forces between the various component layers. The coefficient of friction between fine glass fibers and aluminum foil is not high (about 0.6) so that a measurable pressure must be exerted normal to the layers in order to generate sufficient restraining force. However, if the insulation of FIG. 1 were assembled conventionally to the optimum 60 layers per inch, the interlayer pressure would be immeasurably small (below .001 p.s.i.), many-fold less than the pressure needed for stability under normal commercial service. In fact, the interlayer compression at optimum density is so low that the insulation might be properly visualized as consisting of a series of essentially free-standing foil shields which make only slight contact with the fiber separator.

It follows that a critical problem often encountered in the use of high quality multi-layer insulations is the absence of sufficient inter-layer frictional force to maintain uniform density and avoid displacement of the insulation, particularly under severe service such as mobile insulated tanks. Heretofore, a partial remedy for sagging and instability has been to wrap the insulation more tightly and thereby eliminate the voids and increase inter-layer friction. However, the consequences of obtaining stability by the simple expedient of tightening the layers as they are applied is very severe. It has been observed that in the range of low inter-layer compression corresponding approximately to optimum conditions, only a slight increase in compression will produce an extremely large increase in thermal conductivity. For practical usage, the minimum inter-layer pressure needed for stability, even in light service, may be 20 times greater than the ideal pressure. The thermal conductivity "K" corresponding to such high pressure can easily be two or three times the optimal low value which is sought.

Another damaging consequence of tightening the layers as they are applied is the drastic reduction in insulation thickness. This means that if a given number of total layers of insulation is tightened sufficiently to achieve a stable condition, the thermal conductivity K will not only increase greatly, but the thickness $t$ will also be reduced thereby producing two highly detrimental effects on the insulation performance. The alternative of adding additional layers to overcome the reduction in thickness results in greatly increased cost and weight of the insulation.

As described more completely in copending application Ser. No. 118,740, now abandoned, filed in the name of David I-J. Wang and hereby incorporated by reference, it has been discovered that increasing the compression on the multi-layer insulation does not produce proportionate changes in thermal conductivity. It was also discovered that increasing the compression on the insulation to high values does not produce proportional increases in insulation density.

The significance of this discovery is as follows: Assume that stability of a given insulation system requires that we provide a certain restraining frictional force defined as $\eta$PAc, where $\eta$=the coefficient of friction
$P$=the inter-layer compression
Ac=area over which compression P is applied.

For any required value of $\eta$PAc, it is preferred to increase compression P to a high value over a small area than to increase P only slightly over a large area. Stability is best achieved with this insulation by maintaining almost all of the insulated area under essentially zero compression corresponding to minimum heat conductivity and optimal thickness, and by compressing only a small portion of the area to a relatively high density. On the other hand, if thermal conductivity and density varied linearly with compression as might be expected, then there would be no advantage in reducing area Ac by increasing compression P. In this event, the same impractically high increase in thermal conductivity would be observed for any given value of frictional force $\eta$PAc regardless of the relative values of P and Ac.

Figure 8:
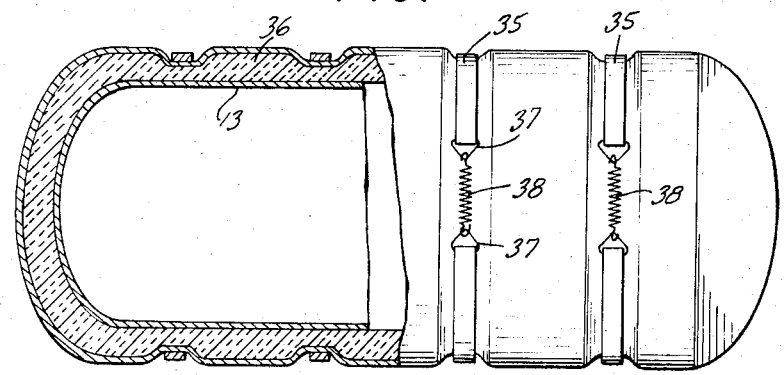
FIG. 8 is a longitudinal elevation view taken partly in cross-section of another double-walled container embodiment employing external tension straps.

More specifically, the FIG. 8 embodiment contemplates multiple tension bands 35 extending laterally around the outer surface of the composite multi-layer insulation 36 having previously been wrapped around container 13. Bands 35 are spaced longitudinally along container 13 in contiguous association with a minor part of the insulation surface, over the previously described bulking means, and under sufficient tension to maintain such part above its stable density. As used herein, the phrase "stable density" refers to the insulation density to which the entire composite insulation body would have to be compressed uniformly in order to achieve mechanical stability without use of the present stabilizing means, e.g., bands 35, under the expected conditions of handling and service of the insulated apparatus.

Ordinary steel strip material, as used by the packaging industry, is usually suitable as bands 35 for either cryogenic or high temperture service, since the insulation protects the bands from extreme thermal conditions. A suitable retaining means such as clips 37 may be provided with a tension spring 38 so as to maintain approximately constant predetermined compression regardless of thermal contraction or expansion of the inner vessel. A degree of band elasticity is especially desirable for cryogenic vessels since thermal contraction of the container tends to relax the insulation compression and results in some loss of stability.

Figure 9:
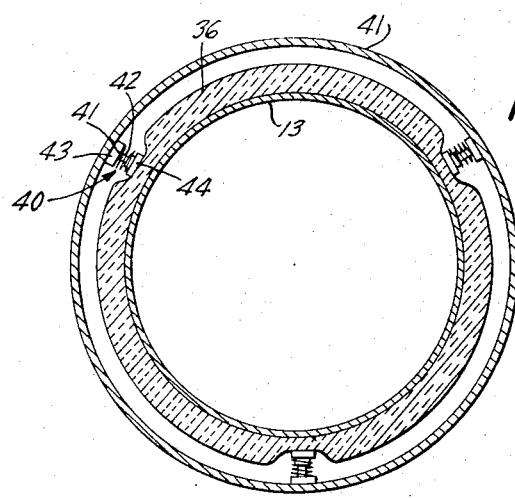
FIG. 9 is an end view of a modified double-walled container using compression members.

Means other than banding are suitable for applying localized compression to a minor part of the instant bulked, multiple-layer insulation so as to maintain the minor part above its stable density. As shown in FIG. 9, compression members 40 may be constructed and arranged between the inner walls of the outer casing 41 and the outer surface of the composite insulating material 36 over the previously described bulking means. The compression members 40 may, for example, comprise center post sleeve 41, spring 42, bushing retainer 43 and shoe retainer 44 at opposite ends of the spring. Bushing retainer 43 may be positioned contiguously to the inner wall of outer shell 41, and shoe retainer 44 may be located contiguous to the outer surface of the composite insulation 36. Any desired member of compression members, e.g., three, may be located in the same vertical plane at uniform intervals around the periphery of the container. Also, the compression members 40 may be spaced at any desired intervals along the longitudinal axis of the container.

There are, however, certain limitations in the compression member system when the inner wall of the outer casing is used as an anchorage for the compression members. These limitations are primarily due to thermal contraction and expansion of the insulated vessel in the axial direction. If the compression member assemblies are spaced along the length of a vessel, they cannot move with the vessel as it shortens or lengthens, and hence tend to tear or distort the insulation. As a consequence, casing-anchored compression members are most effectively used at only one location on the length of the vessel, and this location should be at or near a point which does not move with respect to the casing, i.e., at the point where the container is supported axially. It will be appreciated that such a requirement seriously limits the variety of vessel configurations in which the compression member system may be employed.

Figure 10:
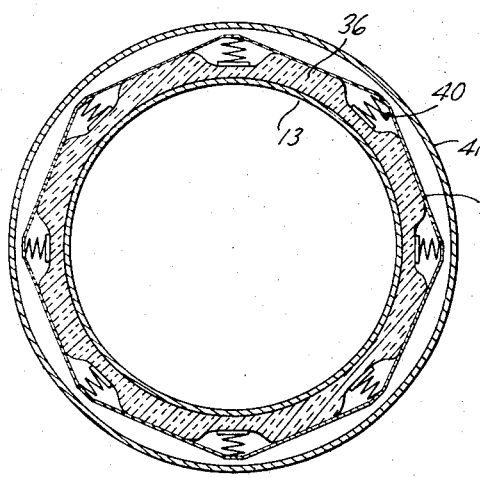
FIG. 10 is an end view of another modified double-walled container construction of this invention employing compression members and girth means.

This problem is overcome in the FIG. 10 embodiment in which multiple compression members 40 are provided for concentrating the total frictional force between the layers of composite insulating material in a minor part of the total insulated area whereby the minor part is above its stable density. One end of each compression member is positioned against the outer surface of the composite insulating material, and the members are preferably arranged in parallel rows around the circumference of the inner vessel and perpendicular to the longitudinal axis of such vessel. Girth means 46 extend laterally around the inner vessel, and are arranged and positioned against the other end of the compression members 40 under sufficient tension for the previously described concentration of total frictional force to maintain the minor part of the insulated area above its stable density. The girth means 46 may, for example, be metal bands, elastically deformable members, coil springs or leaf springs, bands being illustrated in FIG. 10. Such girth means are described more completely in copending application Ser. No. 118,742, now abandoned, filed on June 21, 1961 in the names of E. S. Kordyban et al., which is incorporated herein by reference.

A preferred upper limit of insulated area portion above its stable density is 5%, and best results are obtained when no more than 2.5% of such area is so compressed. The compressive stress should be at least 0.4 p.s.i. for satisfactory stability.

There are no known limits on the maximum compressive stress which may be applied to the minor part of the total insulated area, in accordance with this invention. Indications are that an upper limit for compression of glass fibers without permanent crushing, if one exists, is far above expected practice and possibly on the order of several hundred p.s.i. Any low limit for compressive stress will correspond to low $g$-loading and large area under compression. Stationary storage vessels which are normally free of acceleration loads due to movement may be constructed with very low composite insulation localized compression sufficient only to prevent sagging. Regardless of the service, it is not usually desirable to design insulation for substantially less than about $l$–$g$ loading; otherwise insulation displacement may occur due to handling the vessel during fabrication. A preferred lower limit of about 0.4 p.s.i. compressive stress corresponds approximately to $l$–$g$ gravitational acceleration and 5% compression area. Using lower compressive stresses cause substantial increases in heat transmission and may also lead to stability problems during the wrapping operation.

The composite multi-layer insulation 36 has not been shown in detail in FIGS. 8–10, but may, for example, be similar to that illustrated in FIG. 4 or 7.

Although preferred embodiments of this invention have been described in detail, it will be appreciated that modifications may be made and that some parts may be used without others, all within the contemplation and spirit of the invention. For example, multiple-layer insulations other than the alternating foil and paper fiber type will benefit from the bulking and stabilization methods of this invention.

It has been shown in the previous description that the composite insulation density (layers per inch) which is routinely achieved with alternate layers of fibrous paper and reflective metal barriers is not the best density to employ from the standpoints of overall thermal conductivity and economy. Bulking has been demonstrated as a means for realizing optimum density and thus lower thermal conductivity.

Similarly, the density in layers per inch which is normally obtained with the metal coating-low conductive material substrate form of composite insulation is not the ideal density to employ. This was clearly demonstrated by a series of tests with a 0.00025 inch thick polyethylene terephthalate film having an approximately $8.74 \times 10^{-6}$ inch thick coating of aluminum on one side. The composite had been permanently wrinkled roughly parallel to the length of the roll with the wrinkles spaced approximately ⅛–¼ inch apart.

In one test, sheets of this composite insulation were stacked on a flat surface, compressed slightly to expel air "bubbles," and then permitted to relax to its normal, self-imposed density. Measurements indicated this density to be about 200 layers per inch.

In another test the same composite insulation was wrapped very loosely on a 9.77-inch diameter vessel in an effort to obtain a relatively low density on the order of 100 layers per inch, and thus a lower cost structure. However, the structure collapsed under its own weight and again the density on the crown of the horizontal vessel was measured at 200 layers per inch.

Figure 11:
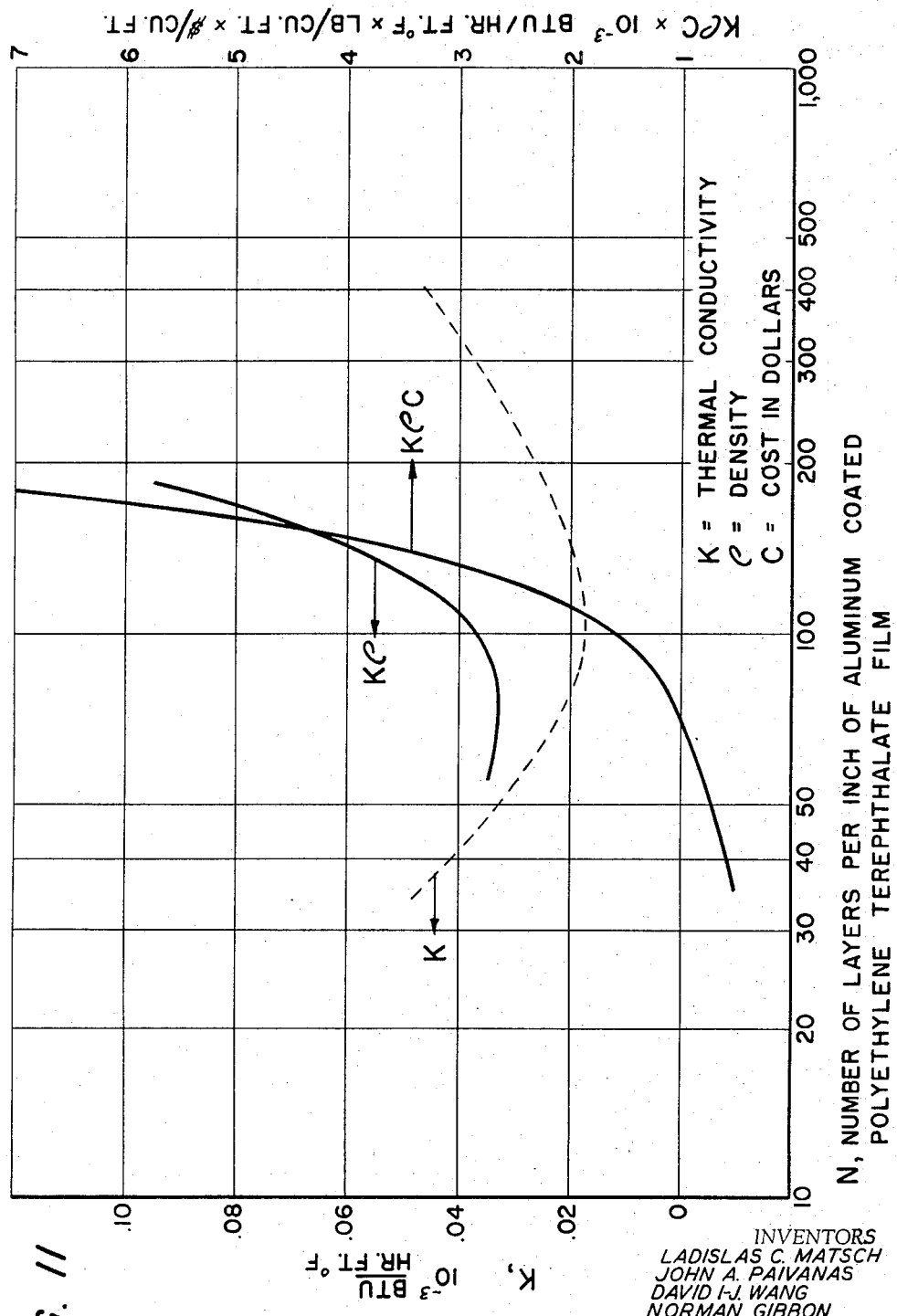
FIG. 11 is a graph showing the effect of compression on the thermal properties of another form of multiple-layer composite insulation, aluminum-coated polyethylene terephthalate film.

Referring now to FIG. 11 which is a plot of the thermal conductivity versus the number of sheets per inch thickness for a similar aluminum-coated polyethylene terephthalate film composite, it can be seen that the thermal conductivity K decreases gradually as the number of layers N is increased, to a minimum occurring near 100 layers per inch. This is far below the self-imposed density of 200 layers per inch discussed previously, and demonstrates that optimum thermal performance is not achieved by normal wrapping.

Normal wrapping also fails to achieve best economy with coated-film type composites. The material is extremely expensive per unit weight as compared to the previously described glass fiber paper-aluminum foil composite. Accordingly, the bulk density $\rho$ (lb./cu. ft.) and unit cost C ($/cu. ft.) are additional important factors in optimizing its use. So important are these factors that the product $K\rho$, rather than $K$ alone, has become the commercially accepted criterion for selecting the desired N-value (number of layers per inch) for metal coated plastic film insulation.

FIG. 11 also contains curves for $K\rho$ vs. $N$ and for $K\rho C$ vs. $N$. The terms $K\rho$ and $K\rho C$ indicate the cost and weight penalties paid to obtain unit heat flow resistance. From the sharp break in the curves at about 100 layers per inch, it is apparent that the penalty is much greater above this shield density than below. This further emphasizes the importance of applying such insulation with low N-values—in this instance near 100 layers/inch—which constructions are not achieved by normal wrapping.

A trial wrapping was made which demonstrates that bulking material preserves the void space within the metal coated low conductive substrate composite, and achieves the desired low density yet insures physical stability. Double strips of 1.6 gm. per sq./ft. density, 0.6 mil thick glass paper were spirally wrapped with the aluminum-coated, polyethylene terephthalate film composite to a total of 60 layers. The bulking strips were ½-inch wide and spaced 13 inches apart, covering an area which was 6.7% of the total insulated area. The finished density was 118 layers per inch—much closer to the preferred $K\rho$ value as indicated by FIG. 11. The density could have been further reduced by employing thicker bulking strips. It was also observed that the bulked insulation was far more stable than when wrapped at 200 layers per inch without bulking strips.

The mechanics of bulking appears to be about the same for both glass paper-aluminum foil insulation and the aluminum-coated polyethylene terephthalate film. Coefficients of friction between components of both insulations are about equal. Both insulations must maintain a very high percentage void space (greater than 90%) within the insulation in order to perform properly. The first mentioned composite maintains this void space by means of thin fibrous paper and the metal-coated low conductive substrate creates the high void fraction by wrinkling. Both void-creating means are extremely compressible— so much that the weight of the composites themselves exceed their inherent density control capabilities.

The wrinkling procedure used with the commercially available aluminum-coated polyethylene terephthalate insulation is intended to lend some bulking influence on the composite, but this influence is inadequate as illustrated by the aforedescribed tests. The extreme thinness and flexibility of the substrates makes it impossible to obtain by means of wrinkles sufficient interlayer support to maintain the required high void fraction in reasonable thicknesses of the composite insulation. The present bulking feature removes the "support" duty from the plastic substrate itself so that wrinkling or creasing is no longer mandatory. Therefore smooth (unwrinkled) metal-coated plastic is a suitable insulating material when bulking material is employed according to this invention, and the wrinkling procedure may be omitted. It is apparent that smooth unwrinkled shields are better oriented normal to incident radiation and will also contain less shield material per unit volume of insulation.

A cross-section of the metal-coated low conductive substrate-bulking component assembly would appear very similar to the FIG. 4 construction except that the radiation reflective component 10 is bonded to the low conductive component substrate 11. The same bulking strips 12 could be employed. Also, the assembly method and apparatus of FIG. 5 would be appropriate for this embodiment except that the friction brake 21 communicates with a composite roll 11–10. Likewise, the perforated fibrous paper sheets 25 having a multiplicity of holes 26 may be used as an alternative bulking component (see FIG. 6). Finally, the stabilizing assemblies of FIGS. 8–10 are beneficial for the reflective metal-coated, low conductive substrate form of multilayered composite insulation.

This invention may also be advantageously employed for bulking of the previously described radiant heat reflecting body-containing paper. This was illustrated in a series of tests with 30% by weight aluminum flake-containing glass fiber paper, the fiber diameter being 0.5–0.75 microns. The paper layers had a density of 2.5 gm./sq. ft., and were tested with no bulking strips, one bulking strip thickness of 2.5 gm./sq. ft. paper, and two bulking strip thicknesses of the same material. The results of these tests are listed in Table I and illustrated in the FIG. 12 graph.

TABLE I

| Number of Bulking Strip Thicknesses | Layers Composite, Insulation/ inch | Composite Insulation Density (pounds/ cu. ft.) | Thermal Conductivity, $K \times 10^{-3}$ B.t.u./hr. sq. ft. ° F./ft. |
|---|---|---|---|
| None | 185 | 12.12 | 0.084 |
| One | 118 | 7.73 | 0.096 |
| Two | 62 | 4.25 | 0.162 |

A plot of this data in FIG. 12 does not show a strong thermal advantage for bulking, although it should be noted that the three points are not adequate to precisely locate and define the optimum. However, it is apparent that bulking does permit an attractive reduction in cost and weight of the insulation without loss in quality. Referring now to FIG. 12, by reading horizontally across the flat minimum it is seen that the same performance is achieved at about 135 layers/inch as at the unbulked 185 layers/inch. Thus, 50 layers/inch of composite insulation can be removed by bulking to obtain about 27% reduction in material cost and weight. The 135 layer/inch composite is readily achieved by using bulking strips of slightly lighter weight than 2.5 gm./sq. ft.

It will be obvious to one of ordinary skill that the principles of the FIGS. 4–10 construction may be employed in bulking the finely divided reflecting body-precompacted paper form of composite layered insulation. In FIG. 4, the radiation reflective sheet 10 would be optional and the paper layer also contains uniformly dispersed small reflecting bodies. In FIG. 5 the friction brake 21 would communicate with the composite insulation layer. In FIG. 6, the perforated fibrous paper sheets 25 having a multiplicity of holes 26 may be used as an alternative bulking component. Also, the stabilizing assemblies of FIGS. 8–10 are useful with this form of composite layered insulation.

As another variation, the invention has been specifically described in terms of insulating containers having curved outer surfaces, but it is equally suitable for flat surfaced, e.g., rectangular panels for insulating refrigerators. Also, the present insulation construction need not completely enclose the source of heat or cold as long as it is contiguously associated and in heat transfer relation with at least part of the source. For example, gas evacuated insulating structures spaces may be provided on the sides of a rectangular container and not on the bottom thereof.

The invention has also been specifically described in terms of a structure for minimizing the heat inleak to a container storing low-boiling liquefied gases. Other cold materials which may be thermally separated from atmospheric heat by employment of this invention include quick frozen biological specimens, living tissues and other perishable commodities.

The invention may also be used to great advantage in the insulation of a heat transferable container at high temperature, as for example, a rocket motor. In this event, heat is transferred to the atmosphere and the present structure serves to minimize the volume and/or weight of insulation. It should be recognized that materials selected for construction of the present structure should be stable at the temperatures to be encountered in usage. For example, if the thermal insulating structure is to be exposed to moderately high temperatures and a low conductive substrate is to be employed, the fluorinated polymers (e.g. polymers of tetrafluoroethylene) are especially suitable as the substrate.

What is claimed is:

1. A thermal insulating structure comprising gas-tight walls enclosing an evacuable space; multiple layers of heat insulative and radiation-impervious composite flexible material within said space comprising a low heat conductive material component coextensive with a radiant heat barrier material component assembled sufficiently closely to provide at least 4 layers per inch of composite non-self supporting insulation with the individual radiant heat barriers being separated by the individual low conductors and disposed generally perpendicular to the direction of heat transfer across the insulation space; and, in addition, low heat conductive elastically compressible bulking material strips between at least some of the composite insulation layers, each strip having a width greater than its thickness in the installed state, said strips having a total surface area contiguously associated with only a minor part of the surface area of the composite insulation layers and having sufficient density to support the composite insulation in the major part of the insulation surface area, with adjacent bulking material strip across said evacuable space being at least partially aligned with each other.

2. A thermal insulating structure according to claim 1 in which said multiple layers of composite flexible material comprise permanently precompacted paper layers of fibers having diameters less than 20 microns and being oriented substantially perpendicular to the direction of heat transfer across the insulation space, finely divided radiant heat reflecting bodies of sizes less than about 500 microns being incorporated in and uniformly dispersed through the layers in an amount between 10% and 60% by weight of the paper, and a binder for cementing the heat reflecting bodies to said fibers; and as said bulking material layers, fibrous paper strips having a total surface area which is 2 to 10% of the permanently precompacted paper area.

3. A thermal insulating structure according to claim 1 in which permanently precompacted fibrous paper layers composed of fibers having diameters less than 20 microns comprise said low heat conductive material component, radiant-heat reflecting sheets of thickness less than 0.2 mm. comprise said radiant heat barrier material component, and fibrous paper strips having a total surface area which is 2 to 10% of the fibrous paper layer area comprise said bulking material.

4. A thermal insulating structure according to claim 1 in which layers of metal-coated, nonmetallic plastic material comprise said heat insulative and radiation-impervious composite flexible material.

5. A thermal insulating structure according to claim 1 in which layers of aluminum-coated, polyethylene terephthalate comprise said heat insulative and radiation-impervious composite flexible material, said polyethylene terephthalate having a thickness between 0.0002 inch and 0.002 inch; and as said bulking material layers, fibrous paper strips having a total surface area which is 2 to 10% of the surface area of said composite flexible material, adjacent paper strips across said evacuable space being at least partially aligned with each other.

6. Apparatus according to claim 1 in which said minor part of the fibrous paper layer surface area contiguously associated with the bulking material is above its self-supporting density and the major part of such area is below its self-supporting density.

7. Apparatus according to claim 1 in which tension band means extend laterally around the outer surface of said composite insulating material in contiguous association with a minor part of such surface and over said bulking material, being under sufficient tension to maintain said minor part at above its stable density.

8. A container for storing materials at low temperature comprising an inner vessel having rigid, self-supporting walls for holding such material; a larger outer gas-tight shell also having rigid, self-supporting walls extending about said inner vessel; an intervening evacuable external load-free insulation space at an absolute pressure not substantially greater than 25 microns of mercury; multiple layers of heat insulative and radiation-impervious composite flexible material within said space comprising permanently precompacted paper layers of fibers having diameters less than 20 microns being oriented substantially perpendicular to the direction of heat transfer across the insulation space, finely divided radiant heat reflecting bodies of sizes less than 500 microns being incorporated in and uniformly dispersed through the layers in an amount between 10% and 60% by weight of the paper, and a binder for cementing the heat reflecting bodies to said fibers, the layers of composite flexible material being positioned around the inner vessel in said insulation space sufficiently closely to provide at least 4 paper layers per inch of composite insulation, and disposed generally perpendicular to the direction of heat transfer across the space; fibrous paper strips, each having a width greater than its thickness in the installed state as low conductive elastically compressible bulking material layers between at least some of the composite insulation layers and having sufficient density to support the composite insulation in the major part of the insulation surface area, having a total surface area contiguously associated with only 2 to 10% of the surface area of said composite insulation and extending laterally around said inner vessel and spaced longitudinally along said vessel in lateral rows of increasing circumference, adjacent paper strips across said insulating space being at least partially aligned with each other.

9. An apparatus for storing of materials at low temperatures comprising an inner vessel having rigid, self-supporting walls for holding such material; a larger outer gas-tight shell also having rigid, self-supporting walls extending about said inner vessel; an intervening evacuable external load-free insulation space at an absolute pressure not substantially greater than 25 microns of mercury, said insulation space containing a series of spaced layers of low heat conductive, permanently precompacted fibrous paper wherein the fiber diameters are less than 15 microns and a series of spaced radiation barriers of thickness between 0.002 mm. and 0.2 mm. coextensive with and being separated and supported by said fibrous paper for reducing the transmission of radiant heat across said space without perceptively increasing the heat transmission by conduction thereacross, the radiant heat barrier-low conductive fibrous paper composite insulating material being positioned around said inner vessel in said insulation space sufficiently closely to provide at least 4 fibrous paper layers per inch of composite insulation, and disposed generally perpendicular to the direction of heat transfer across said space; and low heat conductive elastically compressible bulking material strips between at least some of the fibrous paper layers, each strip having a width greater than its thickness in the installed state and having a total surface area contiguously associated with a minor part of the surface area of said fibrous paper layers and having sufficient density to support the composite insulation in the major part of the total insulation surface area, adjacent bulking material strips across said insulating space being at least partially aligned with each other.

References Cited

UNITED STATES PATENTS

| | | | |
|---|---|---|---|
| 1,215,064 | 2/1917 | Ryan. | |
| 1,334,302 | 3/1920 | Hicks | 229—4.5 |
| 1,376,794 | 5/1921 | Bohan. | |
| 1,730,153 | 10/1929 | Lindsay | 220—9 |
| 1,890,655 | 12/1932 | O'Leary | 220—9 |

(Other references on following page)

UNITED STATES PATENTS

| | | |
|---|---|---|
| 1,956,323 | 4/1934 | Gregg. |
| 1,973,880 | 9/1934 | Moody _____ 220—9 |
| 2,037,813 | 4/1936 | Munters. |
| 2,192,933 | 3/1940 | Saborsky. |
| 2,863,179 | 12/1958 | Gaugler. |
| 2,967,152 | 1/1961 | Matsch et al. _____ 220—9 |
| 3,007,596 | 11/1961 | Matsch _____ 220—9 |
| 3,018,016 | 1/1962 | Hnilicka _____ 220—10 |
| 3,147,878 | 9/1964 | Wissmiller _____ 220—9 |

FOREIGN PATENTS

| | | |
|---|---|---|
| 417,114 | 9/1934 | Great Britain. |
| 715,174 | 9/1954 | Great Britain. |
| 794,835 | 5/1958 | Great Britain. |

THERON E. CONDON, *Primary Examiner.*

JAMES R. GARRETT, *Examiner.*